United States Patent
Mestha et al.

(10) Patent No.: US 7,782,490 B2
(45) Date of Patent: Aug. 24, 2010

(54) SENSITIVITY MATRIX DETERMINATION FOR ADAPTIVE COLOR CONTROL

(75) Inventors: Lalit Keshav Mestha, Fairport, NY (US); Sohail A. Dianat, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 247 days.

(21) Appl. No.: 12/024,221

(22) Filed: Feb. 1, 2008

(65) Prior Publication Data

US 2009/0195797 A1 Aug. 6, 2009

(51) Int. Cl.
*G06F 15/00* (2006.01)
(52) U.S. Cl. .......... 358/1.9; 358/518; 358/504; 382/167; 356/940
(58) Field of Classification Search .......... 358/1.9, 358/504, 518; 382/167; 356/940
See application file for complete search history.

(56) References Cited

U.S. PATENT DOCUMENTS

| | | | |
|---|---|---|---|
| 5,384,901 A | 1/1995 | Glassner et al. | |
| 6,023,525 A | 2/2000 | Cass | |
| 6,157,469 A | 12/2000 | Mestha | |
| 6,236,474 B1 | 5/2001 | Mestha et al. | |
| 6,625,306 B1 | 9/2003 | Marshall et al. | |
| 6,636,628 B1 | 10/2003 | Wang et al. | |
| 6,654,743 B1 | 11/2003 | Hogg et al. | |
| 6,731,796 B2 | 5/2004 | Maltz et al. | |
| 7,054,030 B2 | 5/2006 | Maltz | |
| 7,058,205 B2 | 6/2006 | Jepson et al. | |
| 7,295,215 B2* | 11/2007 | Klassen | 345/604 |
| 7,307,752 B1 | 12/2007 | Mestha et al. | |
| 2005/0071104 A1* | 3/2005 | Viturro et al. | 702/85 |
| 2006/0197966 A1* | 9/2006 | Viturro et al. | 358/1.9 |
| 2008/0130022 A1* | 6/2008 | Dalal et al. | 358/1.9 |

OTHER PUBLICATIONS

Mestha, et al., "Gray Balance Control Loop for Digital Color Printing Systems," *Proceedings of IS&T's "The 21st International Congress on Digital Printing Technologies (NIP21)"*; Sep. 18-23, 2005, Baltimore, Maryland, 6 pages.

* cited by examiner

*Primary Examiner*—Benny Q Tieu
*Assistant Examiner*—Paul F Payer
(74) *Attorney, Agent, or Firm*—Philip E. Blair; Fleit Gibbons Gutman Bongini & Bianco P.L.

(57) ABSTRACT

What is provided are a novel system and method for determining a sensitivity matrix for adaptive color control in a color marking device capable of performing device independent color correction. In one embodiment, a determination is made as to what control operation the color marking device is being characterized for. Nominal CMYK values are then selected based on the determined control operation. If the control operation is a gray balancing operation, the nominal CMYK values are selected using $C=M=Y=L^*$ and $K^*=0$ values. Otherwise, the nominal CMYK values are selected using a CMYK to $L^*a^*b^*$ printer map. Color parameters are determined for the CMYK values based on the selected nominal CMYK values. A sensitivity matrix is then generated from the color parameters and CMYK values. The method facilitates calibration of dynamically varying color reproduction devices.

18 Claims, 2 Drawing Sheets

SENSITIVITY MATRIX DETERMINATION FOR ADAPTIVE COLOR CONTROL

TECHNICAL FIELD

The present invention is directed to systems and method for determining a sensitivity matrix for adaptively correcting color in a color marking device.

BACKGROUND

In today's business and scientific world, color has become essential as a component of communication. Color facilitates the sharing of knowledge and ideas. Companies involved in the development of digital color print engines are continuously looking for ways to improve the total image quality of their products.

One of the elements that affect image quality is the ability to consistently produce the same quality image output on a printer from one day to another. Users have become accustomed to printers and copiers that produce high quality color and gray-scaled output. Users expect to be able to reproduce a color image with consistent quality on any compatible marking device. There is a commercial need for efficiently maintaining print color predictability, particularly as electronic marketing has placed more importance on the accurate representation of merchandise in illustrative print or display media.

Description of color, color perception, and psychological and physiological phenomena involving light, object and observer, including color measurements using spectrophotometers are described in R. W. G. Hunt, "The Reproduction of Color in Photography, Printing and Television", $4^{th}$ Ed., Fountain Press, Tolworth, England (1987) ISBN 0-8524-2356. Color correction and/or control should not be confused with color registration systems and sensors for insuring that colors are positioned properly, printed accurately, superposed correctly and/or adjacent to one another.

The functional models presented herein use a device independent color space to consistently track a set of target colors. L*a*b* are the CIE (Commission Internationale de l'Eclairage) color standards utilized in the modeling wherein L* defines lightness, a* corresponds to the red/green value, and b* denotes the amount of yellow/blue, which corresponds to the way people perceive color. A neutral color is a color where a*=b*=0.

Over time, the output of conventional marking devices drift or deviate from predetermined standards due to various factors which include environmental conditions (temperature, relative humidity, etc.), use patterns, type of media used (e.g., different paper types and paper batches, transparencies, etc.), variations in media, variations from original models used in initialization, wear, etc. When a marking device is originally initialized, and at intervals thereafter, it is calibrated and characterized to produce output as close as possible to a reference standard. However, the calibration and characterization process can be time consuming and expensive.

As an example, calibration and characterization of a conventional four-color CMYK (cyan, magenta, yellow, black) printer or copier involves at least the following processes: 1) generating a 3D Look-Up Table (LUT) for mapping device independent parameter space to CMY space; 2) executing a Gray Component Replacement/Under Color Removal (GCR/UCR) strategy to convert the CMY space parameters to CMYK space parameters which represent the colors of a typical four-color marking device; 3) constructing marking device Tone Reproduction Curves (TRCs) to account for marking device variability (normally done at the time of manufacturing or wherever the printer calibration and characterization process is involved); and 4) applying a suitable half-toning strategy to convert the CMYK continuous tone description obtained after using the 3D LUTs in steps 1 and 2 above and 1D LUTs in step 3 above, to the image, to a binary description (e.g., bits to be received by a raster output scanner or similar device for outputting the image). The first two steps above are generally grouped under printer characterization. The third step is normally called calibration for the purpose hereof. See, Henry R. Kang, "*Color Technology for Electronic Imaging Devices*", ISBN 0-8194-2108-1, SPIE Optical Engineering Press, 1997.

In processing the image, one important step that accounts for variations in marking device output is TRC construction. TRCs are stored plots of an input parameter value versus an output parameter value for a particular color separation such as, C, M, Y, or K. A TRC is a monotonically increasing marking device function in input-output contone space or input-output density space or input-output byte space, or combinations thereof. In other words, a TRC indicates the value of the output parameter for a specific device that is used to reproduce the input parameter (if the input and output parameters are exactly equal then the inputs and outputs are expressed in the same coordinate space). Inaccuracies in TRC construction can lead to inaccuracies in color balancing and the 3D LUT.

Obtaining TRCs for a particular color marking engine is a calibration process, which can be constructed by printing predetermined target colors and measuring the printed target colors using insitu color sensors. Predetermined target colors can be printed as chronological jobs in the banner sheet/header sheet or else the target colors can be extracted from the customer image and measured either by measuring straight from the output image or by rendering subsets of customer colors as target color patches in banner and header pages. Using target colors and their measured counterparts, and by processing the measured colors, TRCs can be adjusted on-line at desired intervals or on request during system or color balance set ups.

Generally, obtaining 1D TRCs is associated with achieving neutral gray balance. Grayness is an indication of how "clean" a process color is compared to its theoretical ideal. Good gray has zero chroma (a*=b*=0). When equal amounts of cyan, magenta and yellow are printed on a white paper, a well balanced printer should produce a neutral gray of the same amount. Instead, a brownish color rather than a neutral gray may occur. The color reproduction system may not produce the desired gray due to various limitations on color pigments of the primaries and the internal processes of the print engine. To overcome this, gray balanced TRCs can be used as 1D LUTs to modulate the amount of cyan, magenta and yellow proportions depending on the state of the materials and the print engine.

The TRCs are obtained by printing large number of patches, mostly near neutral. In the color reproduction industry, colors are often measured using offline spectrophotometers and measured quantities are then modified, generally, by using model based algorithms to produce the desired gray balanced TRCs. Usually this process of printing and producing TRCs is iterated several times until satisfactory results are obtained. This type of approach is time consuming and expensive due to the use of machine models and offline spectrophotometer hardware.

Solutions to the foregoing color correction problems for a wide range of workflow practices are desired in this art. Printing and other enhancements are needed which enable customers to manipulate color documents by controlling color in ways that improve workflow and productivity.

One way of controlling any given color inside the printer gamut can be achieved iteratively by printing and measuring a color patch and varying CMYK/L*a*b* values to follow a desired target color. This often requires a gain matrix function in an adaptive closed loop controller. A sensitivity matrix can be used to calculate the gain matrix can be difficult to compute in the field when calibrating complex color reproduction and marking devices.

Accordingly, what is needed in this art are novel systems and methods heretofore unknown to this art for automatically determining a sensitivity matrix for adaptive color control in color marking devices capable of device independent color correction.

BRIEF SUMMARY

What is provided are a novel system, method, and computer program product for determining a sensitivity matrix for adaptive color control in a color marking device. The sensitivity matrix represents the sensitivity of output color with respect to the input digital values at particular nominal input digital color values. The present method advantageously facilitates calibration of a dynamically varying color reproduction device capable of device independent color correction.

In one example embodiment, the present method for generating a sensitivity matrix for a color marking device involves the following. First, a determination is made as to what control operation a given color marking device is being characterized for. The control operations are any of: a profiling operation, a gray balancing operation, a spot color operation, and a diagnostic operation. Nominal CMYK values are then selected based on the determined control operation. For example, if the control operation is a gray balancing operation, the nominal CMYK values are selected using C=M=Y=L* and K*=0 values. Otherwise, the nominal CMYK values are selected using a CMYK to L*a*b* printer map. Color parameters are determined for CMYK values based on the selected nominal CMYK values. A plurality of different sensitivity matrices are determined using said color parameters. A sensitivity matrix is then generated using a chain rule of differentiation using said plurality of different sensitivity matrices as component matrices in said chain rule, said sensitivity matrix being defined as a gradient of Lab computed with respect to said CMYK values. The generated sensitivity matrix is then used in the control operation to perform a color correction of the color marking device.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
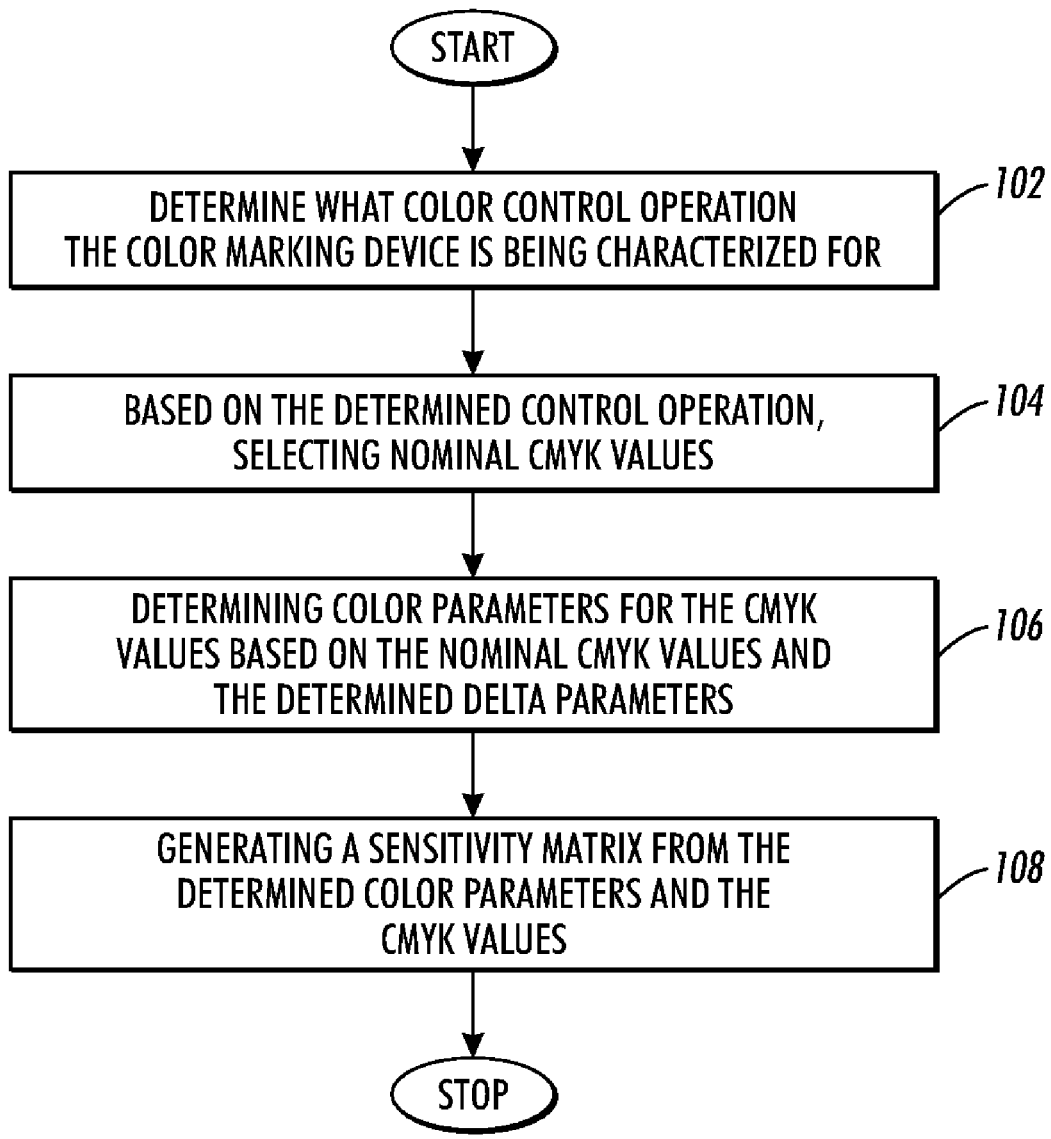
FIG. 1 is a flow diagram illustrating one embodiment of the present method of determining a sensitivity matrix for adaptive color control in a color marking device.

What is provided are a novel system and method for determining a sensitivity matrix for adaptive color control in a color marking device. The sensitivity matrix represents the sensitivity of output color with respect to the input digital values at particular nominal input digital color values. The present method advantageously facilitates calibration of a dynamically varying color reproduction device capable of device independent color correction.

It should be understood, at the onset hereof, that one of ordinary skill in this art would be readily familiar with many facets of color science such as, but not limited to, color space, imaging, color transformation, color calibration, gamut mapping, and other techniques and algorithms common to the color science arts. Additionally, one of ordinary skill would also be familiar with mathematical techniques commonly used for color manipulation and transformation. One of ordinary skill in this art would also be knowledgeable about computer science and software and programming systems and methods sufficient to implement the functionality and capabilities described in detail herein in their own hardware/software environments without undue experimentation.

Several embodiments for sensitivity matrix determination are provided. These are briefly summarized as follows.

In a first embodiment, a series of color patches are printed for different CMYK values which are then used to determine the sensitivity matrix. Patches are scheduled with some variations (deltas) in all directions to the nominal CMYK values. For example, for gray balancing the print engine using iterative algorithm 10 CMYK patches are required. In order to compute a gain matrix, the sensitivity matrix is required for each CMYK patch. This is measured by printing at least 8 patches. Thus a total of 80 patches are required.

In a second embodiment, a pre-calculated number of patches are printed each time when the sensitivity measurements are initiated. Patches are scheduled to build a numerical 3D input-output model of the printer. Using a numerical input-output model such as the Neugebauer model, a sensitivity matrix is extracted for any colors inside the printer gamut. These patches could be simply those used during the characterization process of a printer which may build the parameters required for updating the Neugebauer model. The spectral reflectances of the color patches and primary colors as read by the spectrophotometer sensor are utilized to generate dot growth functions for each of the separations and primary correction curves using Neugebauer concepts. Once the optimum set of dot growth functions and appropriate corrections are found, the model can then be used as a "surrogate printer" to generate the sensitivity matrix.

In a third embodiment, the sensitivity matrix of a printing system is first expressed in terms of analytical expressions using a printer model such as, for example, the Neugebauer model, with random mixing or dot-on-dot mixing primaries. The analytical expressions are derived using chain rule of differentiation. For the Neugebauer model with random mixing, the sensitivity matrix can be expressed in terms of five different matrices wherein each matrix is a measure of sensitivity of different parameters associated with the Neugebauer model.

These various embodiments, and any modifications thereof, can be integrated with the iterative color control system in various forms by one of ordinary skill in this art depending on the product needs. Furthermore, one or more of these embodiments can be scheduled to perform in a transparent fashion to the customers, if required, thereby making the color system adaptive.

The mathematical construct known as the Jacobian is the matrix of first-order partial derivatives of a vector-valued function. It represents a linear approximation to a differentiable function near a given point. If a function is differentiable at a point, it's derivative can be given in coordinates by a Jacobian matrix. In this sense, the Jacobian is the derivative of a multi-variate function. For n>1, the derivative of a numerical function is matrix-valued, or a partial derivative.

Suppose $F:R^n \rightarrow R^m$ is a function from Euclidean n-space to Euclidean m-space. Such a function is given by m real-valued component functions denoted: $y_1(x_1, \ldots, x_n), \ldots, y_m(x_1, \ldots, x_n)$. The partial derivatives of these functions, if they exist, can be organized in an m×n matrix, the Jacobian of F, as follows:

$$\begin{bmatrix} \frac{\partial y_1}{\partial x_1} & \cdots & \frac{\partial y_1}{\partial x_n} \\ \vdots & \ddots & \vdots \\ \frac{\partial y_m}{\partial x_1} & \cdots & \frac{\partial y_m}{\partial x_n} \end{bmatrix}.$$

This matrix can be denoted by:

$$J_F(x_1, \ldots, x_n) \text{ or by: } \frac{\partial(y_1, \ldots, y_m)}{\partial(x_1, \ldots, x_n)}.$$

wherein the $i^{th}$ row of this matrix is given by the transpose of the gradient of the function $y_i$ for $i=1, \ldots, m$.

If p is a point in $R^n$ and F is differentiable at point p, then its derivative is given by: $J_F(p)$. In this case, the linear map described by $J_F(p)$ is the best linear approximation of F near the point p, such that:

$$F(x)=F(p)+J_F(p)(x-p)+o(|x-p|)$$

for x close to p and where o( . . . ) is the little o-notation.

If the components of F are arranged into a column vector, then $$y=(y_1, \ldots, y_m)$$

The Jacobian may be represented as an outer product between the del operator and y:

$$\frac{\partial(y_1, \ldots, y_m)}{\partial(x_1, \ldots, x_n)} = \nabla \otimes y$$

where the outer product symbol is often left out, it being understood that the gradient of a column vector is contextually a matrix.

The sensitivity matrix herein is the matrix of output color with respect to the input digital values at particular nominal input digital color values, and is shown below.

$$B = \nabla_{CMYK}^{L^*a^*b^*} = \begin{bmatrix} \frac{\partial L^*}{\partial C} & \frac{\partial L^*}{\partial M} & \frac{\partial L^*}{\partial Y} & \frac{\partial L^*}{\partial K} \\ \frac{\partial a^*}{\partial C} & \frac{\partial a^*}{\partial M} & \frac{\partial a^*}{\partial Y} & \frac{\partial a^*}{\partial K} \\ \frac{\partial b^*}{\partial C} & \frac{\partial b^*}{\partial M} & \frac{\partial b^*}{\partial Y} & \frac{\partial b^*}{\partial K} \end{bmatrix}$$

Reference is now being made to the flow diagram of FIG. 1 illustrating a flow diagram of one embodiment for determining a sensitivity matrix for a color marking device.

At step 102, a determination is made as to what control operation the color marking device is being characterized for. At step 104, nominal CMYK values are then selected based on the determined control operation. If the control operation is a gray balancing operation, the nominal CMYK values are selected using $C=M=Y=L^*$ and $K^*=0$ values. Otherwise, the nominal CMYK values are selected using CMYK to $L^*a^*b^*$ printer map. At step 106, color parameters are determined for the CMYK values based on the selected nominal CMYK values. At step 108, a sensitivity matrix is generated from the color parameters and CMYK values.

In another embodiment, delta parameters are determined for each CMYK color separation and the color parameters determined for the CMYK values are based on the selected nominal CMYK values and the delta parameters.

In another embodiment, if control operation is a gray balancing operation, at least one K tone reproduction curve obtained through iterative control of the $L^*$ values is used by printing only K separation patches, and at least one CMY tone reproduction curve obtained through iterative control of a desired aim $L^*a^*b^*$ values is used by printing only mixed CMY patches.

In yet another embodiment, if the control operation is a diagnostic operation which shows a change in the marking device's sensitivity matrix, any change in output performance of the marking device is indicated. If the control operation is a spot color operation that uses the marking device's sensitivity matrix for a spot color operation to improve color accuracy performance, the color parameters are measured and a control operation which leads to a best CMYK values for the spot color is performed.

In yet a further embodiment, a test image containing a plurality of color control patches of the determined CMYK values is printed. $L^*a^*b^*$ values of the color control patches on the printed test image are measured and a gain matrix is generated from the measured $L^*a^*b^*$ values and the sensitivity matrix. In one embodiment, the gain matrix is used in a closed loop controller to control color drift in a marking device capable of device independent color correct. One such closed loop control algorithm is described in U.S. Pat. No. 6,157,469 to Mestha et al., which is incorporated herein by reference in its entirety. Therein, a gain matrix is utilized inside a closed loop controller for adaptive color correction.

The delta parameter vector contains the plus or minus delta value for C,M,Y and K separations to be assigned to the nominal CMYK values individually referred to as: $C_{nominal}$, $M_{nominal}$, $Y_{nominal}$, and $K_{nominal}$. In order to determine the sensitivity matrix for controlling a single color, at least 8 patches will be required. Their CMYK patch values are created using the delta parameters and the chosen nominal CMYK values. The combination of the delta parameters and the chosen nominal CMYK values produces the following patches.

Patch#1: $C=C_{nominal}$+deltaC, $M=M_{nominal}$, $Y=Y_{nominal}$, $K=K_{nominal}$ Patch#2: $C=C_{nominal}$−deltaC, $M=M_{nominal}$, $Y=Y_{nominal}$, $K=K_{nominal}$ Patch#3: $C=C_{nominal}$, $M=M_{nominal}$+deltaM, $Y=Y_{nominal}$, $K=K_{nominal}$ Patch#4: $C=C_{nominal}$, $M=M_{nominal}$−deltaM, $Y=Y_{nominal}$, $K=K_{nominal}$ Patch#5: $C=C_{nominal}$, $M=M_{nominal}$, $Y=Y_{nominal}$+deltaY, $K=K_{nominal}$ Patch#6: $C=C_{nominal}$, $M=M_{nominal}$, $Y=Y_{nominal}$–deltaY, $K=K_{nominal}$ Patch#7: $C=C_{nominal}$, $M=M_{nominal}$, $Y=Y_{nominal}$, $K=K_{nominal}$+deltaK Patch#8: $C=C_{nominal}$, $M=M_{nominal}$, $Y=Y_{nominal}$, $K=K_{nominal}$+deltaK These eight patches are used for computing the sensitivity matrix of one CMYK control patch.

The above exemplary flows describe, with more specificity, the present method used for computing the sensitivity matrix for CMYK→L*a*b* gamut. As in gray balancing the print engine with CMYK separations, wherein K tone reproduction curves (TRCs) are obtained through iterative control of L* values by printing only K separation patches, and wherein CMY tone reproduction curves (TRCs) are obtained through iterative control of desired aim L*a*b* values by printing mixed CMY patches, one skilled in the art would understand that the patches described above are selected accordingly. For example, when sensitivity matrix for CMY→L*a*b* gamut alone are required, K separation values are set to zero, which reduces the number of patches to six. An extension hereof to additional gamuts, MYK→L*a*b*, CYK→L*a*b*, etc., can be readily made by one of ordinary skill without undue experimentation.

A test image is created using the CMYK values with patches of the desired size depending on the required sensing area. The image could be in PostScript or any other suitable image format.

The color patches are printed and the L*a*b* values of the printed color patches are measured. The L*a*b* values can be measured in-situ using color sensors or measured off-line using standard spectrophotometers. The measured L*a*b* values and the sensitivity matrix shown above, are both used to calculate the gain matrix. The element dL*/dC is obtained by determining the difference between the L* values of, for example, patch#1 with patch#2, and dividing the L* difference with the value of: 2*deltaC.

A gain matrix can be then computed from the L*a*b* values and the sensitivity matrix using, in one embodiment, a multivariable pole placement algorithm such as, for example, the place( )function found in the MATLAB algorithm common in this art. One skilled in this art would readily understand matrix computation via a hardware or software construct.

The input-output sensitivity functions (or slopes) for computing gain values for controlling a single parameter such as L* for K patches are determined. This type of input-output sensitivity (slope) computation is useful at least for two applications: (1) Gray balancing the print engine with CMYK separations, wherein K tone reproduction curves (TRCs) are obtained through iterative control of L* values by printing only K separation patches, and wherein CMY tone reproduction curves (TRCs) are obtained through iterative control of desired aim L*a*b* values by printing mixed CMY patches; and (2) Accurately controlling L* values through iterations for digital black and white printers. This requires the printing of at least two patches for computing the slope of one K-control patch. For gray balance control loop comprising 10 CMY control patches and 10 K control patches, at least 80 patches are required for measuring the sensitivity functions.

If the above-described method for slope determination is extended for controlling spot colors then each spot color will become one control patch. In some printing systems, it may be desirable to provide the control of 2000 spot colors. For such applications, determining the sensitivity function in such a manner may not be efficient. This is addressed in an alternative embodiment hereof wherein a numerical model of the print engine is constructed using patches in the test image.

In this embodiment, a pre-calculated number of patches are printed each time when the sensitivity measurement is initiated. These patches could be those patches used during the characterization process of a printer used to build the parameters of a Neugebauer model as in the reference mentioned below [R Balasubramanian, . . . ]. The spectral reflectances of the color patches and primary colors, as read by the spectrophotometer sensor, are utilized to generate dot growth functions for each of the separations and primary correction curves using Neugebauer concepts. The algorithms utilized are explained in, "A Printer Model for Dot-on-Dot Halftone Screens", by R. Balasubramanian, Proc. SPIE: Color Hard Copy and Graphic Arts IV, Vol. 2413, pp. 356-364, (1995), which is incorporated herein by reference in its entirety.

Once the optimum set of dot growth functions and appropriate corrections are found, these can be portrayed as a printer model capable of providing L*a*b* values for a given CMYK digital value (e.g., nominal CMY values for CMY control patches and nominal K values for K control patches). This particular model can be utilized as a "surrogate printer" and exploited to generate the sensitivity matrix or the slopes, as needed. The Neugebauer model can be cellular or non-cellular as needed to maintain an accuracy level that is in line with the product specification.

In alternative embodiment, the sensitivity matrix of a printing system is expressed in terms of analytical expressions using a printer model, such as the Neugebauer model with random mixing or dot-on-dot mixing primaries. The sensitivity matrix is derived using the chain rule of differentiation and represents the sensitivity of output color with respect to the input digital values. For the Neugebauer model with random mixing, the sensitivity matrix B can be expressed in terms of five different sensitivity matrices, as shown, wherein each matrix is a measure of sensitivity of different parameters associated with the Neugebauer model.

$$B = \nabla_{XYZ}^{Lab} \times \nabla_{R(\lambda)}^{XYZ} \times \nabla_{W}^{R(\lambda)} \times \nabla_{cmyk}^{W} \times \nabla_{CMYK}^{cmyk}$$

As an example, a detailed description of the steps involved in determining the component matrices is given below. It should be understood that, while the present method has been described in conjunction with one embodiment for random mixing model, a similar approach is applicable for a dot-on-dot mixing model.

One embodiment of determining the sensitivity function for a Neugebauer model with random mixing is as follows:

First, sixteen (16) primaries are generated and their corresponding reflectance spectra is measured. This reflectance spectra can be given by: $R_i(\lambda)$, i=1, 2, . . . , 16. These measured reflectance spectra are referred to herein as primary reflectance spectra.

This requires printing 16 patches with 100% area coverage in each separation. Details of the mixing are shown below in the following colors of the 16 patches.

White=$R_W$ (no toner)=$R_1$
Black=$R_k$=$R_2$
Yellow=$R_y$=$R_3$
Yellow, Black=$R_{yk}$=$R_4$
Magenta=$R_m$=$R_5$
Magenta, Black=$R_{mk}$=$R_6$
Magenta, Yellow=$R_{my}$=$R_7$
Magenta, Yellow, Black=$R_{myk}$=$R_8$
Cyan=$R_c$=$R_9$
Cyan, Black=$R_{ck}$=$R_{10}$
Cyan, Yellow=$R_{cy}$=$R_{11}$
Cyan, Yellow, Black=$R_{cyk}$=$R_{12}$ Cyan, Magenta=$R_{cm}$=$R_{13}$
Cyan, Magenta, Black=$R_{cmk}$=$R_{14}$
Cyan, Magenta, Yellow=$R_{cmy}$=$R_{15}$
Cyan, Magenta, Yellow, Black=$R_{cmyk}$=$R_{16}$ A total of 10 single separation cyan patches (anywhere between 0% cyan to 100%, excluding 0% and 100%) are printed. Their corresponding reflectance spectra, as given by: $R_{ci}(\lambda)$, i=1, 2, . . . , 10, is measured. The fractional area coverages can then be computed using, for example, the least square approach as shown below.

$$c(i) = \frac{\sum_{\lambda}\left[R_W^{\frac{1}{n}}(\lambda) - R_{ci}^{\frac{1}{n}}(\lambda)\right]\left[R_W^{\frac{1}{n}}(\lambda) - R_{ci}^{\frac{1}{n}}(\lambda)\right]}{\sum_{\lambda}\left[R_W^{\frac{1}{n}}(\lambda) - R_{ci}^{\frac{1}{n}}(\lambda)\right]^2}, i = 1, 2, \ldots, 10$$

The function $R_{ci}$ is the reflectance spectra of the $i^{th}$ cyan patch. Using these fractional area coverages, the cyan dot growth function is built. In this equation, n represents the Yule-Nielson correction factor which varies between 1 and 2.5.

The following steps are repeated for other separations; a) compute their weights using similar equation shown above for cyan, and b) build magenta, yellow and black dot growth functions. This calculation produces the printer model.

In order to compute the sensitivity matrix for a given CMYK target patch, the following are performed.

A dot growth functions is used to compute dot areas c, m, y, and k corresponding to the digital value of the colorants C, M, Y, and K for the CMYK target patch.

Mixing equations, as shown below, are used to compute the Neugebauer primary areas, given by: w(i), i=1, . . . , 16, such that:

$w(1)=(1-c)(1-m)(1-y)(1-k)$ $w(2)=(1-c)(1-m)(1-y)k$ $w(3)=(1-c)(1-m)y(1-k)$ $w(4)=(1-c)(1-m)yk$ $w(5)=(1-c)m(1-y)(1-k)$ $w(6)=(1-c)m(1-y)k$ $w(7)=(1-c)my(1-k)$ $w(8)=(1-c)myk$ $w(9)=c(1-m)(1-y)(1-k)$ $w(10)=c(1-m)(1-y)k$ $w(11)=c(1-m)y(1-k)$ $w(12)=c(1-m)yk$ $w(13)=cm(1-y)(1-k)$ $w(14)=cm(1-y)k$ $w(15)=cmy(1-k)$ $w(16)=cmyk$ The primary reflectance spectra and the Neugebauer primary areas are used to compute the predicted reflectance of the target patch, as given by:

$$R(\lambda) = \left[\sum_{i=1}^{16} w(i) R_i^{\frac{1}{n}}(\lambda)\right]^n$$

The values of XYZ, and L*a*b* are computed using the following equations:

$$X = 100 \frac{\sum_{\lambda} R(\lambda) D_{50}(\lambda) x(\lambda)}{\sum_{\lambda} D_{50}(\lambda) y(\lambda)}$$

$$Y = 100 \frac{\sum_{\lambda} R(\lambda) D_{50}(\lambda) y(\lambda)}{\sum_{\lambda} D_{50}(\lambda) y(\lambda)}$$

$$Z = 100 \frac{\sum_{\lambda} R(\lambda) D_{50}(\lambda) z(\lambda)}{\sum_{\lambda} D_{50}(\lambda) y(\lambda)}$$

$R(\lambda)$=Refectance spectra $D_{50}(\lambda)$=Standard illuminant $\lambda$=[380 730]

$x(\lambda), y(\lambda), z(\lambda)$, are color matching functions $$L^* = 116\left[f\left(\frac{Y}{Y_n}\right) - \frac{16}{116}\right]$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(x) = \begin{cases} x^{\frac{1}{3}} & \text{if } x \geq 0.008856 \\ 7.787x + \frac{16}{116} & x \leq 0.008856 \end{cases}$$

$X_n, Y_n, Z_n$ are tristimulus values of the reference white

The gradient of L*a*b* is computed with respect to XYZ, as given by:

$w(1)=(1-c)(1-m)(1-y)(1-k)$ $w(2)=(1-c)(1-m)(1-y)k$ $w(3)=(1-c)(1-m)y(1-k)$ $w(4)=(1-c)(1-m)yk$ $w(5)=(1-c)m(1-y)(1-k)$ $w(6)=(1-c)m(1-y)k$ $w(7)=(1-c)my(1-k)$ $w(8)=(1-c)myk$ $w(9)=c(1-m)(1-y)(1-k)$ $w(10)=c(1-m)(1-y)k$ $w(11)=c(1-m)y(1-k)$ $w(12)=c(1-m)yk$ $w(13)=cm(1-y)(1-k)$ $w(14)=cm(1-y)k$ $w(15)=cmy(1-k)$ $w(16)=cmyk$ After differentiation, the gradient equation is given by:

$$\nabla_{XYZ}^{L^*a^*b^*} = \begin{bmatrix} 0 & \frac{116}{Y_n}g\left(\frac{Y}{Y_n}\right) & 0 \\ \frac{500}{X_n}g\left(\frac{X}{X_n}\right) & -\frac{500}{Y_n}g\left(\frac{Y}{Y_n}\right) & 0 \\ 0 & \frac{200}{Y_n}g\left(\frac{Y}{Y_n}\right) & -\frac{200}{Z_n}g\left(\frac{Z}{Z_n}\right) \end{bmatrix}$$

$$g(\alpha) = \begin{cases} \frac{1}{3}\alpha^{-\frac{2}{3}} & \alpha > 0.008856 \\ 7.787 & \alpha \leq 0.008856 \end{cases}$$

The gradient of XYZ can be computed with respect to the reflectance spectra, $R(\lambda)$, $\nabla_{R(\lambda)}^{XYZ}=3\times 31$, such that:

$$\nabla_{R(\lambda)}^{XYZ} = \begin{bmatrix} \frac{x*D_{50}}{\sum D_{50}y} \\ \frac{y*D_{50}}{\sum D_{50}y} \\ \frac{z*D_{50}}{\sum D_{50}y} \end{bmatrix} = \begin{bmatrix} E_1 \\ E_2 \\ E_3 \end{bmatrix}$$

where $\underline{E}_1, \underline{E}_2, \underline{E}_3$ are row vectors with dimension 1×31. The vectors x, y and z and $D_{50}$ used above are defined in Principles of Color Technology, by Fred W. Billmeyer, Jr. and Max Saltzman, John Wiley & Sons, ISBN 0-471-03052-X (1981).

The gradient of $R(\lambda)$ is computed with respect to Neugebauer primary areas, given by: $\nabla_W^{R(\lambda)}=31\times 16$, such that: $\nabla_W^{R(\lambda)}=[r_1\ r_2\ \ldots\ r_{16}]$, where $r_i$ is a 31×1 column vector given by:

$$r_i = nR(\lambda)^{\frac{n-1}{n}} R_i(\lambda)^{\frac{1}{n}} \quad 31\times 1$$

$$i = 1, 2, \ldots 16$$

The gradient of the Neugebauer primary areas is then computed with respect to dot areas, given by: $\nabla_{cmyk}^W=16\times 4$. The analytical expression for the gradient is shown below.

The gradient of the dot areas is computed with respect to input digital values, given by: $\nabla_{CMYK}^{cmyk}=4\times 4$, such that:

$$\nabla_{CMYK}^{cmyk} = \begin{bmatrix} \frac{dc}{dC} & 0 & 0 & 0 \\ 0 & \frac{dm}{dM} & 0 & 0 \\ 0 & 0 & \frac{dy}{dY} & 0 \\ 0 & 0 & 0 & \frac{dk}{dK} \end{bmatrix}$$

where $\frac{dc}{dC}, \frac{dm}{dM}, \frac{dy}{dY},$ and $\frac{dk}{dK}$ are slopes of cyan, magenta, yellow and black dot growth functions evaluated at the target CMYK patch. It should be noted that the cyan dot area depends only on the cyan digital value. Similarly the magenta, yellow and black depend on their corresponding digital values only.

The sensitivity matrix can then be computed using chain rule of differentiation, such that:

$B=\nabla_{CMYK}^{Lab}=\nabla_{XYZ}^{Lab}\times\nabla_{R(\lambda)}^{XYZ}\times\nabla_W^{R(\lambda)}\times\nabla_{cmyk}^W\times\nabla_{CMYK}^{cmyk}$.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 2:
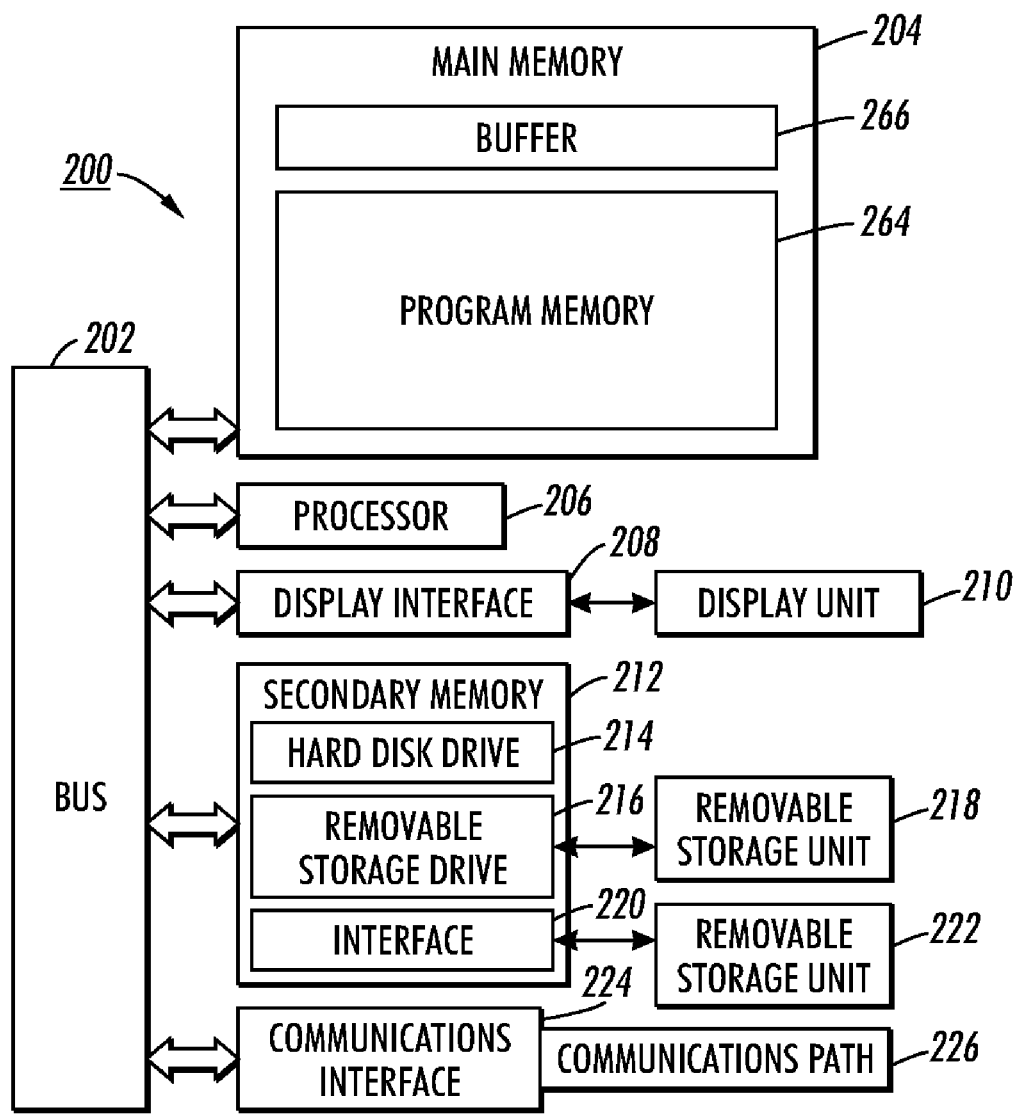
FIG. 2 illustrates one embodiment of a block diagram of a computer system useful for implementing one or more of the methods provided herein.

Reference is now being made the system of FIG. 2 illustrating one embodiment of a block diagram of a computer system useful for implementing one or more of the methods provided herein.

The computer system 200 can be, for example, a xerographic system, a photocopier, or printing device. The computer system includes one or more processors, such as processor 206 capable of executing machine executable program instructions. In the embodiment shown, the processor is in communication with bus 202 (e.g., a backplane interface bus, cross-over bar, or data network). The computer system also includes a main memory 204 that is used to store machine readable instructions. The main memory also being capable of storing data. Main memory may alternatively include random access memory (RAM) to support reprogramming and flexible data storage. Buffer 266 is used to temporarily store data for access by the processor. Program memory 264 includes, for example, executable programs that implement the embodiments of the methods described herein. The program memory storing at least a subset of the data contained in the buffer.

Computer system 200 includes a display interface 208 that forwards data from communication bus 202 (or from a frame buffer not shown) to display 210.

Computer system 200 also includes a secondary memory 212 includes, for example, a hard disk drive 214 and/or a removable storage drive 216 which reads and writes to removable storage 218, such as a floppy disk, magnetic tape, optical disk, etc., that stores computer software and/or data. The secondary memory alternatively includes other similar mechanisms for allowing computer programs or other instructions to be loaded into the computer system. Such mechanisms include, for example, a removable storage unit 222 adapted to exchange data through interface 220.

Examples of such mechanisms include a program cartridge and cartridge interface (such as that found in video game devices), a removable memory chip (such as an EPROM, or PROM) and associated socket, and other removable units and interfaces which allow software and data to be transferred.

The computer system 200 includes a communications interface 224 which acts as both an input and an output to allow software and data to be transferred between the computer system and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via communications interface 224. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface. These signals are provided to a communications interface via a communications path (i.e., channel) which carries signals and may be implemented using wire, cable, fiber optic, phone line, cellular link, RF, or other communications channels.

OTHER VARIATIONS

Terms such as, computer program medium, computer executable medium, computer usable medium, and computer readable medium, are used herein to generally refer to media such as main memory and secondary memory, removable storage drive, a hard disk installed in a disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allows a computer to read such computer readable information.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for generating a sensitivity matrix for color correction of a color marking device, the method comprising:
   determining what control operation a color marking device is being characterized for;
   selecting nominal CMYK values based on said determined control operation;
   determining color parameters for CMYK values based on said selected nominal CMYK values; and
   determining a plurality of different sensitivity matrices using said color parameters; and
   generating a sensitivity matrix using a chain rule of differentiation using said plurality of different sensitivity matrices as component matrices in said chain rule, said sensitivity matrix being defined as a gradient of Lab computed with respect to said CMYK values, wherein said determined color parameters comprise XYZ, R(λ), W, and cmyk, and wherein said sensitivity matrix, as given by $\nabla_{CMYK}^{Lab}$, comprises:

$$\nabla_{CMYK}^{Lab} = \nabla_{XYZ}^{Lab} \times \nabla_{R(\lambda)}^{XYZ} \times \nabla_{W}^{R(\lambda)} \times \nabla_{cmyk}^{W} \times \nabla_{CMYK}^{cmyk},$$

where component matrix $\nabla_{XYZ}^{Lab}$ is a sensitivity matrix defined as the gradient of Lab computed with respect to XYZ, component matrix $\nabla_{R(\lambda)}^{XYZ}$ is a sensitivity matrix defined as the gradient of XYZ computed with respect to R(λ), component matrix $\nabla_{W}^{R(\lambda)}$ is a sensitivity matrix defined as the gradient of R(λ) computed with respect to W, component matrix $\nabla_{cmyk}^{W}$ is a sensitivity matrix defined as the gradient of W computed with respect to cmyk, and component matrix $\nabla_{CMYK}^{cmyk}$ is a sensitivity matrix defined as the gradient of cmyk computed with respect to said CMYK values.

2. The method of claim 1, wherein in response to said control operation being a gray balancing operation, further comprising:
selecting said nominal CMYK values using C=M=Y=L* and K*=0 values, otherwise selecting said nominal CMYK values using a CMYK to L*a*b* printer map;
using at least one K tone reproduction curve obtained through iterative control of said L* values by printing only K separation patches; and
utilizing at least one CMY tone reproduction curve obtained through iterative control of a desired aim L*a*b* values by printing only mixed CMY patches.

3. The method of claim 1, wherein in response to said control operation being a profiling operation, selecting said nominal CMYK values using a CMYK to L*a*b* printer map.

4. The method of claim 1, wherein in response to said control operation being a diagnostic operation which shows a change in said marking device's sensitivity matrix, indicating any change in output performance of said marking device.

5. The method of claim 1, wherein in response to said control operation being a spot color operation that uses said marking device's sensitivity matrix for a spot color operation to improve color accuracy performance, further comprising:
measuring said color parameters; and
performing a control operation which leads to a best CMYK values for said spot color.

6. The method of claim 1, further comprising:
printing a test image containing a plurality of color control patches of said determined CMYK values;
measuring L*a*b* values of said color control patches on said printed test image;
generating a gain matrix from said measured L*a*b* values and said sensitivity matrix
determining delta parameters for each CMYK color separation; and
determining said color parameters for said CMYK values based on said selected nominal CMYK values and said determined delta parameters.

7. A system for generating a sensitivity matrix for color correction of a color marking device, the system comprising:
a storage medium capable of storing data; and
a processor in communication with said storage medium, said processor capable of executing a machine readable instruction for performing the method of:
determining what control operation a color marking device is being characterized for;
selecting nominal CMYK values based on said determined control operation;
determining color parameters for CMYK values based on said selected nominal CMYK values;
determining a plurality of different sensitivity matrices using said color parameters; and
generating a sensitivity matrix using a chain rule of differentiation using said plurality of different sensitivity matrices as component matrices in said chain rule, said sensitivity matrix being defined as a gradient of Lab computed with respect to said CMYK values, wherein said determined color parameters comprise XYZ, R(λ), W, and cmyk, and wherein said sensitivity matrix, as given by $\nabla_{CMYK}^{Lab}$, comprises:

$$\nabla_{CMYK}^{Lab} = \nabla_{XYZ}^{Lab} \times \nabla_{R(\lambda)}^{XYZ} \times \nabla_{W}^{R(\lambda)} \times \nabla_{cmyk}^{W} \times \nabla_{CMYK}^{cmyk}$$

where component matrix $\nabla_{XYZ}^{Lab}$ is a sensitivity matrix defined as the gradient of Lab computed with respect to XYZ, component matrix $\nabla_{R(\lambda)}^{XYZ}$ is a sensitivity matrix defined as the gradient of XYZ computed with respect to R(λ), component matrix $\nabla_{W}^{R(\lambda)}$ is a sensitivity matrix defined as the gradient of R(λ) computed with respect to W, component matrix $\nabla_{cmyk}^{W}$ is a sensitivity matrix defined as the gradient of W computed with respect to cmyk, and component matrix $\nabla_{CMYK}^{cmyk}$ is a sensitivity matrix defined as the gradient of cmyk computed with respect to said CMYK values.

8. The system of claim 7, wherein in response to said control operation being a gray balancing operation, further comprising:
selecting said nominal CMYK values using C=M=Y=L* and K*=0 values, otherwise selecting said nominal CMYK values using a CMYK to L*a*b* printer map;
using at least one K tone reproduction curve obtained through iterative control of said L* values by printing only K separation patches; and
utilizing at least one CMY tone reproduction curve obtained through iterative control of a desired aim L*a*b* values by printing only mixed CMY patches.

9. The system of claim 7, wherein in response to said control operation being a profiling operation, selecting said nominal CMYK values using a CMYK to L*a*b* printer map.

10. The system of claim 7, wherein in response to said control operation being a diagnostic operation which shows a change in said marking device's sensitivity matrix, indicating any change in output performance of said marking device.

11. The system of claim 7, wherein in response to said control operation being a spot color operation that uses said marking device's sensitivity matrix for a spot color operation to improve color accuracy performance, further comprising:
measuring said color parameters; and
performing a control operation which leads to a best CMYK values for said spot color.

12. The system of claim 7, further comprising:
printing a test image containing a plurality of color control patches of said CMYK values;
measuring L*a*b* values of said color control patches on said printed test image;
generating a gain matrix from said measured L*a*b* values and said sensitivity matrix;
determining delta parameters for each CMYK color separation; and
determining said color parameters for said CMYK values based on said selected nominal CMYK values and said determined delta parameters.

13. A computer program product for generating a sensitivity matrix for color correction of a color marking device, the computer program product comprising:
   a non-transitory computer-usable data carrier storing machine-readable instructions that, when executed on a computer, cause the computer to perform a color correction for a color marking device, said machine-readable instructions comprising:
   determining what control operation a color marking device is being characterized for;
   selecting nominal CMYK values based on said determined control operation;
   determining color parameters for CMYK values based on said selected nominal CMYK values;
   determining a plurality of different sensitivity matrices using said color parameters; and
   generating a sensitivity matrix using a chain rule of differentiation using said plurality of different sensitivity matrices as component matrices in said chain rule, said sensitivity matrix being defined as a gradient of Lab computed with respect to said CMYK values, wherein said determined color parameters comprise XYZ, R($\lambda$), W, and cmyk, and wherein said sensitivity matrix, as given by $\nabla_{CMYK}^{Lab}$, comprises:

$$\nabla_{CMYK}^{Lab} = \nabla_{XYZ}^{Lab} \times \nabla_{R(\lambda)}^{XYZ} \times \nabla_{W}^{R(\lambda)} \times \nabla_{cmyk}^{W} \times \nabla_{CMYK}^{cmyk}$$

where component matrix $\nabla_{XYZ}^{Lab}$ is a sensitivity matrix defined as the gradient of Lab computed with respect to XYZ, component matrix $\nabla_{R(\lambda)}^{XYZ}$ is a sensitivity matrix defined as the gradient of XYZ computed with respect to R($\lambda$), component matrix $\nabla_{W}^{R(\lambda)}$ is a sensitivity matrix defined as the gradient of R($\lambda$) computed with respect to W, component matrix $\nabla_{cmyk}^{W}$ is a sensitivity matrix defined as the gradient of W computed with respect to cmyk, and component matrix $\nabla_{CMYK}^{cmyk}$ is a sensitivity matrix defined as the gradient of cmyk computed with respect to said CMYK values.

14. The computer program product of claim 13, wherein in response to said control operation being a gray balancing operation, further comprising:

selecting said nominal CMYK values using C=M=Y=L* and K*=0 values, otherwise selecting said nominal CMYK values using a CMYK to L*a*b* printer map;
using at least one K tone reproduction curve obtained through iterative control of said L* values by printing only K separation patches; and
utilizing at least one CMY tone reproduction curve obtained through iterative control of a desired aim L*a*b* values by printing only mixed CMY patches.

15. The computer program product of claim 13, wherein in response to said control operation being a profiling operation, selecting said nominal CMYK values using a CMYK to L*a*b* printer map.

16. The computer program product of claim 13, wherein in response to said control operation being a diagnostic operation which shows a change in said marking device's sensitivity matrix, indicating any change in output performance of said marking device.

17. The computer program product of claim 13, wherein in response to said control operation being a spot color operation that uses said marking device's sensitivity matrix for a spot color operation to improve color accuracy performance, further comprising:
   measuring said color parameters; and
   performing a control operation which leads to a best CMYK values for said spot color.

18. The computer program product of claim 13, further comprising:
   printing a test image containing a plurality of color control patches of said determined CMYK values;
   measuring L*a*b* values of said color control patches on said printed test image;
   generating a gain matrix from said measured L*a*b* values and said sensitivity matrix;
   determining delta parameters for each CMYK color separation; and
   determining said color parameters for said CMYK values based on said selected nominal CMYK values and said determined delta parameters.

* * * * *